US009889518B2

(12) United States Patent
Nishimura (10) Patent No.: US 9,889,518 B2
(45) Date of Patent: Feb. 13, 2018

(54) CONSUMABLE ELECTRODE GAS SHIELD ARC WELDING TORCH AND POWER FEED TIP (75) Inventor: Masaru Nishimura, Osaka (JP)

(73) Assignee: DAIHEN Corporation, Osaka (JP)

(*) Notice: Subject to any disclaimer, the term of this patent is extended or adjusted under 35 U.S.C. 154(b) by 1640 days.

(21) Appl. No.: 12/377,152

(22) PCT Filed: Aug. 10, 2007

(86) PCT No.: PCT/JP2007/065749
§ 371 (c)(1),
(2), (4) Date: Feb. 11, 2009

(87) PCT Pub. No.: WO2008/018594
PCT Pub. Date: Feb. 14, 2008

(65) Prior Publication Data
US 2010/0038345 A1 Feb. 18, 2010

(30) Foreign Application Priority Data
Aug. 11, 2006 (JP) ................. 2006-220084

(51) Int. Cl.
B23K 9/12 (2006.01)
B23K 9/26 (2006.01)
B23K 9/29 (2006.01)

(52) U.S. Cl.
CPC .............. B23K 9/123 (2013.01); B23K 9/26 (2013.01); B23K 9/295 (2013.01)

(58) Field of Classification Search
CPC ......... B23K 9/1336; B23K 9/32; B23K 9/124
USPC ............ 219/137.2, 137.44, 137.52, 137.61
See application file for complete search history.

(56) References Cited

U.S. PATENT DOCUMENTS 6,559,416 B1* 5/2003 Steenis et al. ........... 219/137.61
2003/0019857 A1* 1/2003 Takagi et al. ........... 219/137.61
2005/0218132 A1* 10/2005 Wells ...................... 219/137.61

FOREIGN PATENT DOCUMENTS

JP 2002-59265 2/2002
JP 2002-059265 A * 2/2002
JP 2002-144037 5/2002
JP 2004-1088 1/2004

OTHER PUBLICATIONS

Machine translation of JP 2002-059,265, Nov. 2011.*

* cited by examiner

Primary Examiner — Tu B Hoang
Assistant Examiner — Thomas Ward
(74) Attorney, Agent, or Firm — Hamre, Schumann, Mueller & Larson, P.C.

(57) ABSTRACT

A consumable electrode gas shield arc welding torch (20) includes a torch body (21), a tip body (22) mounted to a front end of the torch body, a tip holder (23) mounted to a front end of the tip body, a spring (26) provided in the tip body (22) in contact with the front end of the torch body (21), a pressing shaft (27) provided in the tip body (22) in contact with a front end of the spring 26) and a power feed tip (28) pressed by the pressing shaft (27) and the tip holder (23). The tip (28) includes a side surface having a projection contacting with a base end (23a) of the holder (23), with a space (29) defined between an inner surface of the holder (23) and a front end (28a) of the tip (28) when the front end (28a) of the tip (28) is inserted into the holder (23).

11 Claims, 11 Drawing Sheets

CONSUMABLE ELECTRODE GAS SHIELD ARC WELDING TORCH AND POWER FEED TIP

TECHNICAL FIELD

The present invention relates to a consumable electrode gas shield arc welding torch (hereinafter referred to as "welding torch") to be mounted to a wrist portion of an industrial robot.

BACKGROUND ART

Figure 10:
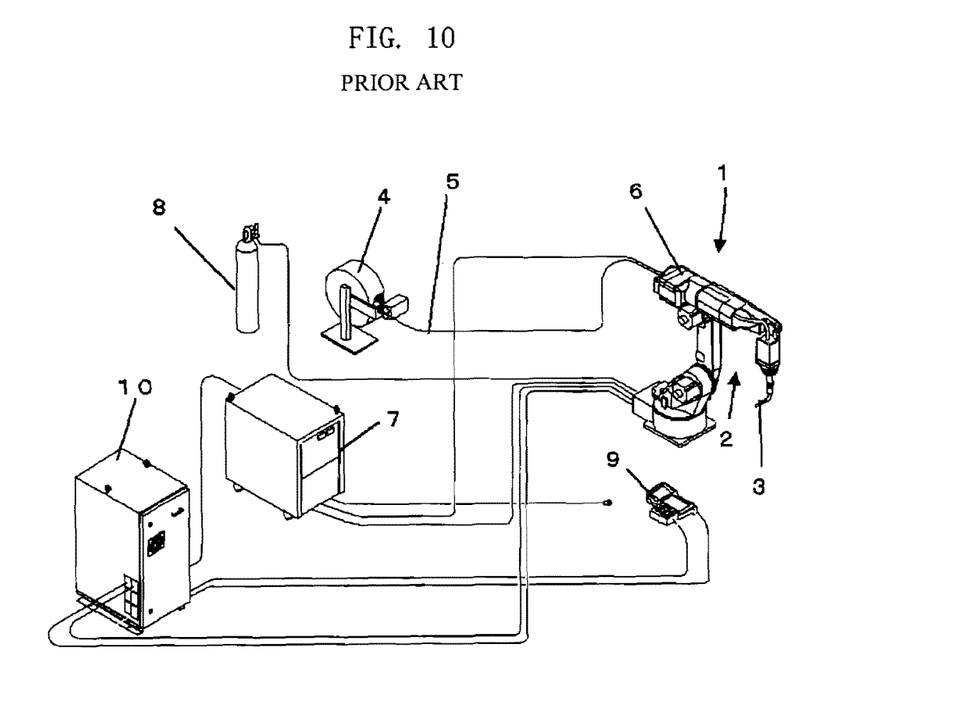
FIG. 10 shows a typical structure of a welding robot as an articulated robot.

In these days, to enhance the work efficiency of welding, automatic welding using a welding robot has been employed. FIG. 10 shows the typical structure of a welding robot which is an articulated robot. As shown in the figure, a welding torch 3 is mounted to an end of a wrist portion 2 of a manipulator 1. A welding wire 5 is wound on a wire reel 4 and fed to the welding torch 3 by a wire feeder 6 mounted to the manipulator 1. Electric power is supplied from a welding power source 7 to the welding torch 3. Shielding gas is supplied from a gas cylinder 8 to the welding torch 3. Command signals are inputted from a teach pendant 9 into a robot controller 10. Signals from the robot controller 10 are inputted into the manipulator 1. Thus, the position of the end of the welding torch 3 is controlled by rotating six shafts made up of a first shaft through a sixth shaft.

Figure 11:
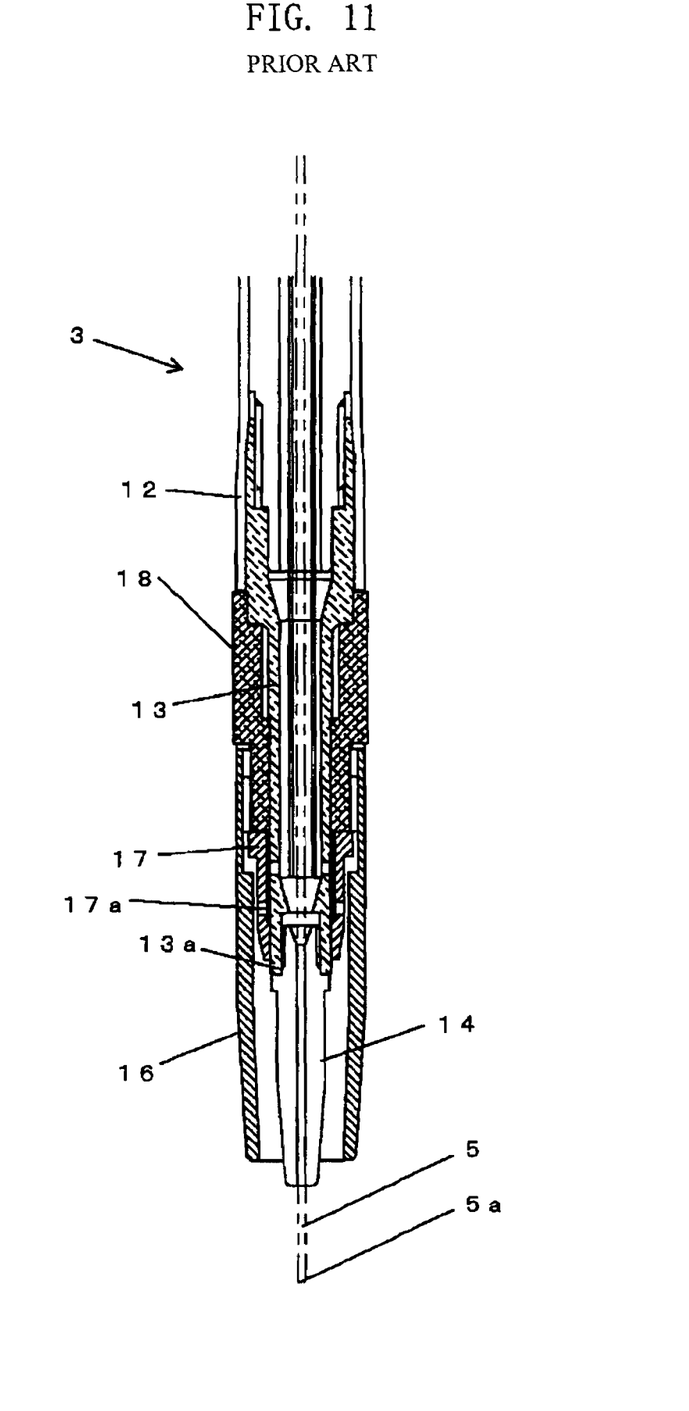
FIG. 11 is a sectional view of a conventional welding torch.

The conventionally used welding torch 3 will be described below with reference to the sectional view of FIG. 11. As shown in the figure, a tip body 13 is mounted to a torch body 12. A power feed tip 14 is mounted to the front end 13a of the tip body. Each of the torch body 12, the tip body 13 and the power feed tip 14 is formed with a wire insertion hole at the axial center. The welding wire 5 is inserted to pass through the wire insertion holes to come into contact with the interior of the power feed tip 14, whereby electric power is supplied to the welding wire 5.

An orifice 17 is provided at a lower portion of the tip body 13. A nozzle 16 is provided to surround the power feed tip 14 and the orifice 17. The shielding gas is belched through an injection hole 17a provided at the orifice 17. The belched shielding gas shields the arc, the molten pool and the nearby portion from nitrogen and oxygen in the air. An insulating bush 18 is provided around the tip body 13.

Since the welding wire 5 to be fed to the welding torch 3 is generally wound on the wire reel 4, the welding wire 5 has a tendency to be bent. Since such a bending tendency of the welding wire 5 is not uniform, it is difficult to position the front end of the welding wire 5 being fed out of the power feed tip 14 accurately at the intended welding position. Further, even when the bending tendency of the welding wire 5 is made uniform before the welding wire is fed to the welding torch 3, there still is a problem. That is, when the posture of the robot is changed in a complicated way, the wire guide liner (not shown) for guiding the welding wire 5 is twisted, so that the welding wire 5 to be fed to the welding torch 3 is twisted. As a result, the front end of the welding wire 5 cannot be accurately positioned at the intended welding position. Thus, uniform and beautiful weld beads cannot be obtained.

As noted before, electric power is supplied to the welding wire 5 by bringing the welding wire 5 into contact with the interior of the power feed tip 14. Herein, when the bend of the welding wire 5 is not uniform, the contact point between the welding wire 5 and the power feed tip 14 is not fixed. As a result, the length of the projecting portion of the welding wire (i.e., the distance from the contact point between the welding wire 5 and the power feed tip 14 to the front end 5a of the welding wire 5) varies. Thus, the resistive heating of the projecting portion of the welding wire 5 varies, so that the melting amount of the welding wire 5 varies. As a result, the arc length varies, so that welding cannot be performed uniformly.

When the welding wire 5 is stored in a pail pack instead of the wire reel 4, the degree of the bending tendency of the welding wire 5 is relatively small. Thus, the contact point between the welding wire 5 and the power feed tip 14 varies, which may cause a spark to be produced between the welding wire 5 and the inner surface of the power feed tip 14. Due to the heat of the spark, the power feed tip 14 wears out or the welding wire 5 is fused to the inner surface of the power feed tip 14. As a result, the lifetime of the power feed tip 14 is shortened, and the power feed tip 14 needs to be replaced frequently. It has been demanded that the number of times the operation of the robot is stopped for replacement of the power feed tip 14 and so on is reduced, and the conventional structure does not satisfy the demand.

To solve the above-described problems, another welding torch has been proposed. In this welding torch, the power feed tip includes an outer tip and an inner tip. The outer tip is formed with a vertical slit extending from the front end along the wire insertion hole. The inner tip is pressed by a spring provided in the tip body (see Patent Document 1, for example). As will be described below, however, this arrangement cannot reduce the influence of the arc heat on the inner tip, so that the lifetime of the inner tip cannot be increased.

Patent Document 1: JP-A-2002-59265

It is said that heat of thousands to tens of thousands of degrees is generated at the welding point. Due to the radiant heat, the front end of the power feed tip is heated to reach a high temperature of almost hundreds to a thousand of degrees. Since the power feed tip is generally made of a copper alloy, the power feed tip reduces the surface hardness and softens as the temperature rises. As a result, the abrasion of the power feed tip progresses at an accelerating pace. Thus, the lifetime of the power feed tip cannot be increased.

DISCLOSURE OF THE INVENTION

The present invention has been proposed under the circumstances described above. It is, therefore, an object of the present invention to provide a welding torch which is capable of increasing the lifetime of the power feed tip mounted to the front end of the welding torch.

According to a first aspect of the present invention, there is provided a consumable electrode gas shield arc welding torch comprising a torch body provided with a wire insertion hole at an axial center, a tip body provided with a wire insertion hole at an axial center and mounted to a front end of the torch body, a tip holder provided with a wire insertion hole at an axial center and mounted to a front end of the tip body, a spring provided with a wire insertion hole at an axial center and provided in the tip body to come into contact with the front end of the torch body, a pressing shaft provided with a wire insertion hole at an axial center and provided in the tip body to come into contact with a front end of the spring, and a power feed tip provided with a wire insertion hole at an axial center and pressed by the pressing shaft and the tip holder. The power feed tip includes a side surface formed with a projection for coming into contact with a base end of the tip holder so that a space is defined between an inner surface of the tip holder and a front end of the power feed tip when the front end of the power feed tip is inserted into the tip holder.

Preferably, the power feed tip is formed with at least one vertical slit extending from the front end of the power feed tip along the wire insertion hole of the tip. The projection of the power feed tip includes a tapered portion for coming into contact with the base end of the tip holder. The spring presses the pressing shaft and the pressing shaft presses the power feed tip so that the inner surface of the wire insertion hole of the power feed tip presses a welding wire.

Preferably, the power feed tip is further formed with a horizontal slit provided adjacent to a terminating end of the vertical slit and extending perpendicularly to the vertical slit. Alternatively, the power feed tip includes a thin-walled portion adjacent to the terminating end of the vertical slit.

Preferably, the tip holder is heat-resistant.

Preferably, a heat-resistant member provided with a wire insertion hole at an axial center is embedded in a front end of the tip holder.

Preferably, the base end of the tip holder is formed with an inclined surface for coming into contact with the tapered portion of the power feed tip.

Preferably, the power feed tip includes a base end formed with a tapered portion, and wherein the pressing shaft includes a front end formed with an inclined surface for coming into contact with the tapered portion of the base end of the power feed tip.

According to a second aspect of the present invention, there is provided a power feed tip to be used for a consumable electrode gas shield arc welding torch. The consumable electrode gas shield arc welding torch comprises a torch body, a tip body mounted to a front end of the torch body, a tip holder mounted to a front end of the tip body, a spring provided in the tip body to come into contact with the front end of the torch body, and a pressing shaft provided in the tip body to come into contact with a front end of the spring. The power feed tip is pressed by the pressing shaft and the tip holder. The power feed tip comprises a front end for insertion into the tip holder, a wire insertion hole extending along an axial center of the power feed tip, at least one vertical slit extending from the front end of the power feed tip along the wire insertion hole, and a tapered portion for coming into contact with a base end of the tip holder so that a space is defined between an inner surface of the tip holder and the front end of the power feed tip when the front end of the power feed tip is inserted into the tip holder.

Preferably, the power feed tip further comprises at least one horizontal slit provided adjacent to a terminating end of the vertical slit and extending perpendicularly to the vertical slit. Alternatively, the power feed tip further comprises a thin-walled portion adjacent to the terminating end of the vertical slit.

According to a third aspect of the present invention, there is provided a tip holder to be used for a consumable electrode gas shield arc welding torch. The consumable electrode gas shield arc welding torch comprises a torch body, a tip body mounted to a front end of the torch body, a spring provided in the tip body to come into contact with the front end of the torch body, a pressing shaft provided in the tip body to come into contact with a front end of the spring, and a power feed tip including a tapered portion provided around an axial center. The tip holder is mounted to a front end of the tip body and comprises a through-hole extending along an axial center of the tip holder. The front end of the power feed tip is inserted into the through-hole. The tip holder of the present invention further comprises a base end for coming into contact with the tapered portion of the power feed tip so that a space is defined between an inner surface of the tip holder and the front end of the power feed tip when the front end of the power feed tip is inserted into the through-hole.

Preferably, the tip holder of the present invention is made of a heat-resistant material.

Preferably, a heat-resistant member provided with a wire insertion hole is embedded in the tip holder of the present invention.

Preferably, the base end of the tip holder of the present invention is formed with an inclined surface for coming into contact with the tapered portion of the power feed tip.

BEST MODE FOR CARRYING OUT THE INVENTION

Figure 1:
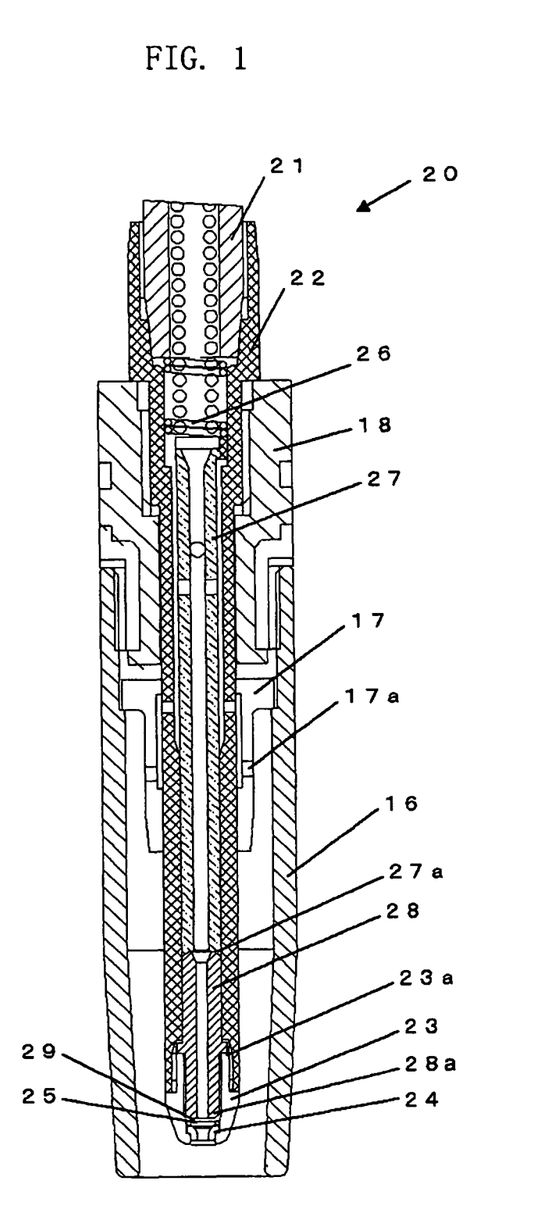
FIG. 1 is a sectional view showing a welding torch according to a first embodiment of the present invention.
Figure 2:
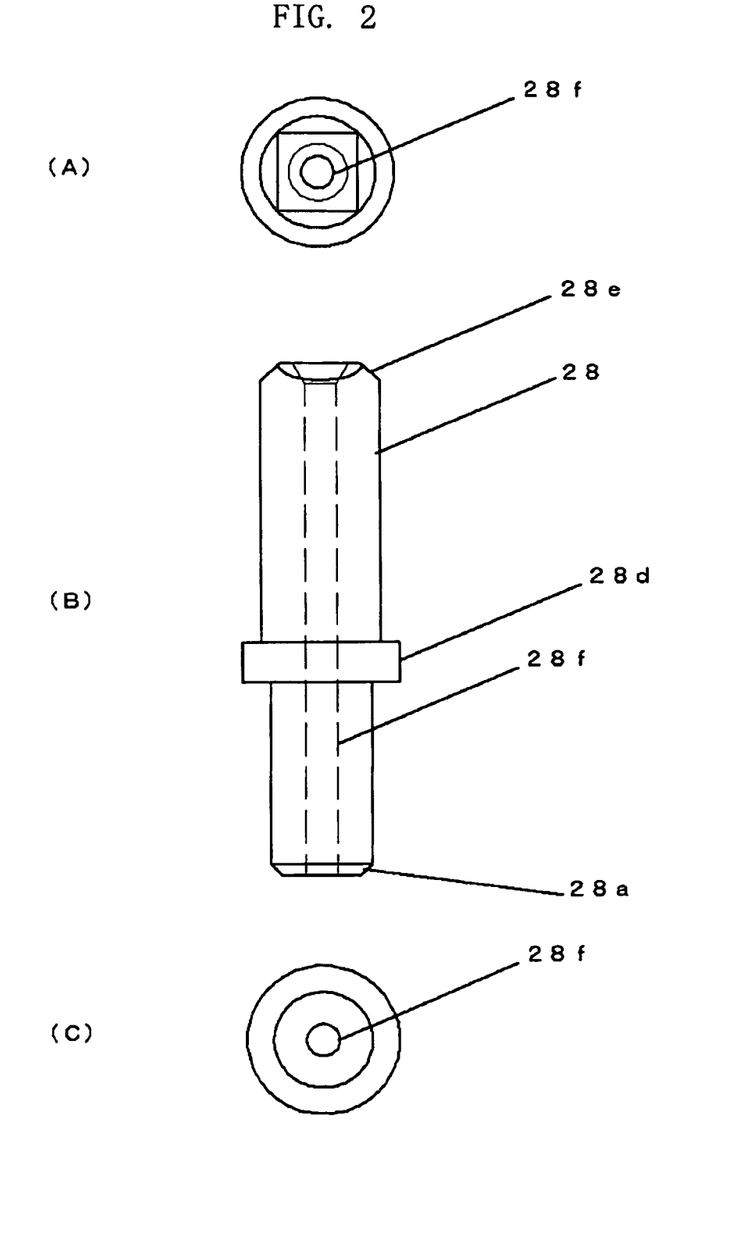
FIG. 2 shows a power feed tip of the welding torch of the first embodiment.

Preferred embodiments of the present invention will be described below with reference to the accompanying drawings. FIG. 1 is a sectional view showing a welding torch 20 according to a first embodiment of the present invention. FIG. 2 shows a power feed tip 28 of the welding torch 20. Specifically, FIG. 2(A) is a plan view, FIG. 2(B) is a front view and FIG. 2(C) is a bottom view. As shown in FIG. 1, a tip body 22 is mounted to the front end of a torch body 21. A tip holder 23 is mounted to the front end of the tip body 22. A heat-resistant member 24 is embedded in the front end of the tip holder 23. The heat-resistant member 24 is fixed by a ring 25. This arrangement suppresses the transfer of heat generated at the welding point to the power feed tip 28 and hence reduces the abrasion of the power feed tip 28 so that the lifetime of the power feed tip is increased. Each of the torch body 21, the tip body 22, the tip holder 23, the heat-resistant member 24 and the ring 25 is formed with a wire insertion hole at the axial center.

A spring 26 is provided in the tip body 22. The base end (upper end in FIG. 1) of the spring 26 is held in contact with the front end (lower end in FIG. 1) of the torch body 21. A pressing shaft 27 is provided in the tip body 22. The base end of the pressing shaft 27 is held in contact with the front end of the spring 26. Each of the spring 26 and the pressing shaft 27 is formed with a wire insertion hole at the axial center.

The power feed tip 28 is formed with a wire insertion hole at the axial center. The power feed tip 28 is provided in the tip body 22. The front end of the power feed tip 28 is inserted in a through-hole of the tip holder 23. The base end of the power feed tip 28 is held in contact with the front end of the pressing shaft 27. Thus, the power feed tip 28 is pressed by the pressing shaft 27 and the tip holder 23.

An orifice 17 is provided at a lower portion of the tip body 22. A nozzle 16 is provided to surround the tip holder 23 and the orifice 17. Shielding gas is belched through an injection hole 17a of the orifice 17. The belched shielding gas shields the arc, the molten pool and the nearby portion from nitrogen and oxygen in the air. An insulating bush 18 is provided around the tip body 22.

The power feed tip 28 will be described below with reference to FIG. 2. As shown in the figure, the power feed tip 28 is formed with a wire insertion hole 28f at the axial center. The side surface of the power feed tip 28 is formed with a projection 28d for engagement with the base end 23a (see FIG. 1) of the tip holder. The position of the projection 28d is so set that a space 29 is defined between the inner surface of the tip holder 23 and the front end 28a of the power feed tip when the front end 28a of the power feed tip is inserted into the tip holder 23. Preferably, the space 29 extends also between the inner surface of the tip holder 23 and the side surface of the power feed tip 28. This arrangement is achieved by setting the inner diameter of the through-hole of the tip holder 23 (the hole extending along the axis of the power feed tip for receiving the front end 28a of the power feed tip) to be larger than the outer diameter of the front end 28a of the power feed tip. Due to the existence of the space 29, the heat generated in welding is prevented from being directly transferred to the power feed tip 28, whereby the temperature rise of the power feed tip 28 is suppressed.

The base end of the power feed tip 28 is formed with a tapered portion 28e. The front end of the pressing shaft 27 is formed with an inclined surface 27a for surface contact with the tapered portion 28e of the base end of the power feed tip 28. With this arrangement, the pressing shaft 27 pressed by the spring 26 stably presses the power feed tip 28.

The operation of the first embodiment will be described below. As noted before, the tip body 22 is mounted to the front end of the torch body 21, and the tip holder 23 is mounted to the front end of the tip body 22. The spring 26 and the pressing shaft 27 are provided in the tip body 22. The base end of the spring 26 is held in contact with the front end of the torch body 21. The base end of the pressing shaft 27 is held in contact with the front end of the spring 26.

The power feed tip 28 is provided in the tip body 22. The front end of the power feed tip 28 is inserted in the tip holder 23. In this state, the projection 28d formed at the side surface of the power feed tip 28 engages the base end 23a of the tip holder. With this arrangement, the space 29 is defined between the inner surface of the tip holder 23 and the front end 28a of the power feed tip 28.

The orifice 17 is provided at a lower portion of the tip body 13. The nozzle 16 is provided to surround the tip holder 23 and the orifice 17. Shielding gas is belched through the injection hole 17a of the orifice. The belched shielding gas shields the arc, the molten pool and the nearby portion from nitrogen and oxygen in the air. The insulating bush 18 is provided around the tip body 13.

With the above-described arrangement, the spring 26 presses the pressing shaft 27, and the pressing shaft 27 and the tip holder 23 press the power feed tip 28. The electric power supplied to the torch body 21 is supplied to the power feed tip 28 through the tip body 22 and the tip holder 23.

The space 29 defined between the inner surface of the tip holder 23 and the front end 28a of the power feed tip 28 prevents the heat generated in welding from being directly transferred to the power feed tip 28. Thus, the power feed tip 28 does not directly receive arc heat, and hence, is prevented from being softened. As a result, the abrasion of the power feed tip 28 is suppressed, whereby the lifetime of the power feed tip 28 is increased. Further, since the power feed tip 28 is not heated to a high temperature, an oxide film is not formed on the surface of the power feed tip 28. Thus, proper power supply is maintained.

Unlike the conventional structure, the power feed tip 28 having the above-described shape can be formed by simple machining, and screwing of the base end of the power feed tip 28 is not necessary. Thus, the machining time is reduced. Further, hard materials such as copper-tungsten the screwing of which is difficult can be used as the material of the power feed tip 28.

The power feed tip 28 can be reused by changing its contact point with the welding wire 5 by rotating the power feed tip 28 within the tip holder 23 and the front end of the tip body 22 to change the mounting position. Further, by plating the tip holder 23, the adhesion of spatters is prevented.

Figure 3:
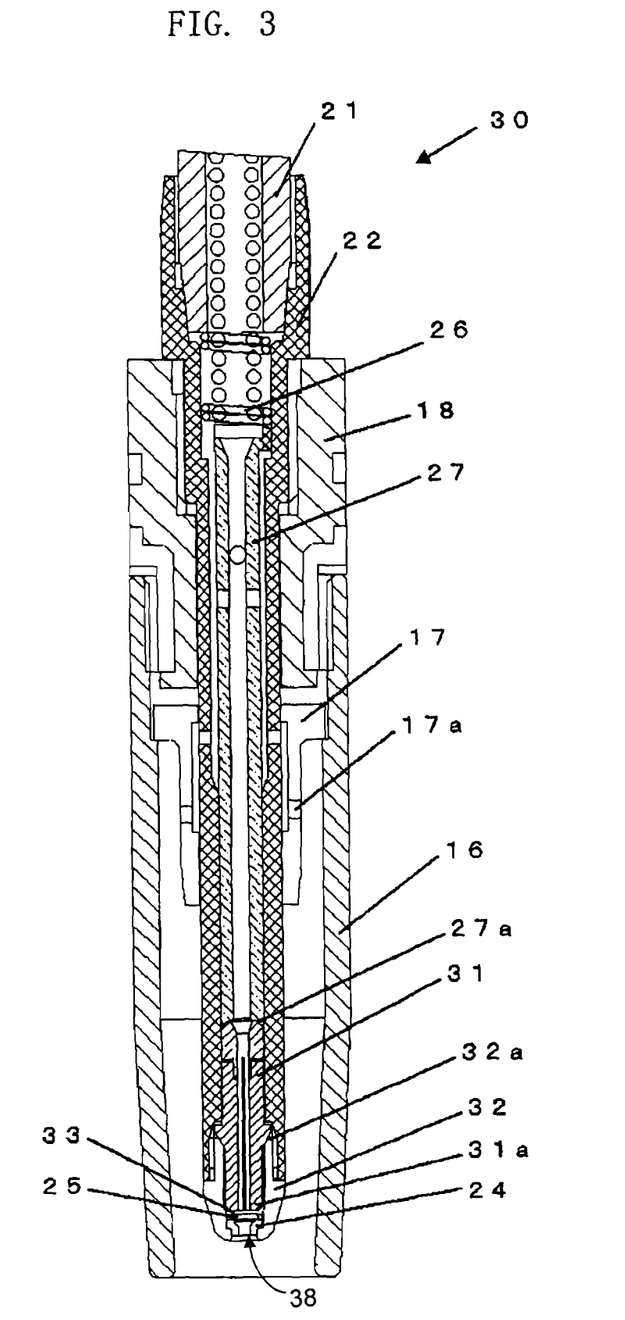
FIG. 3 is a sectional view showing a welding torch according to a second embodiment of the present invention.
Figure 4:
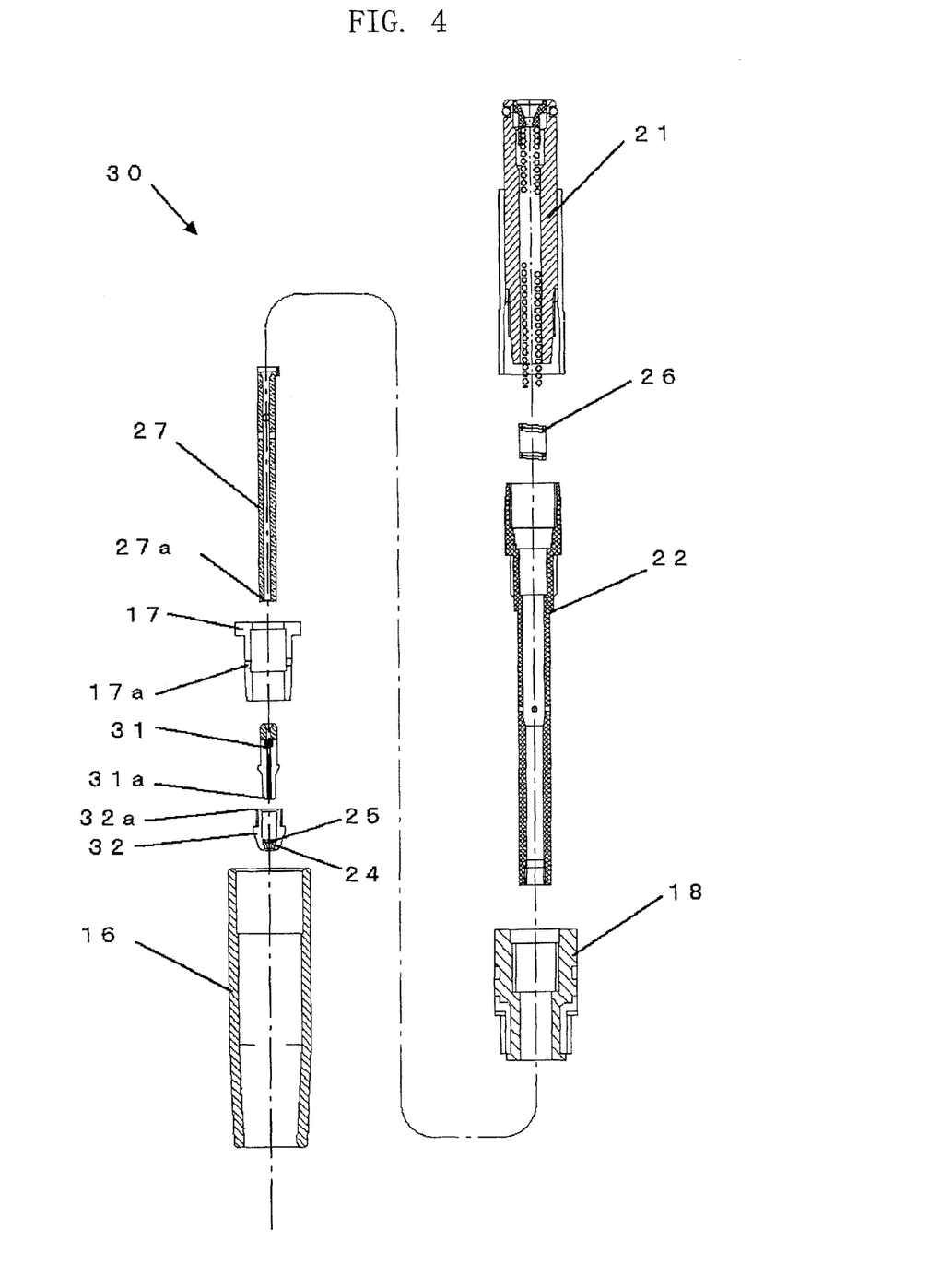
FIG. 4 is an exploded sectional view showing the welding torch of the second embodiment.
Figure 5:
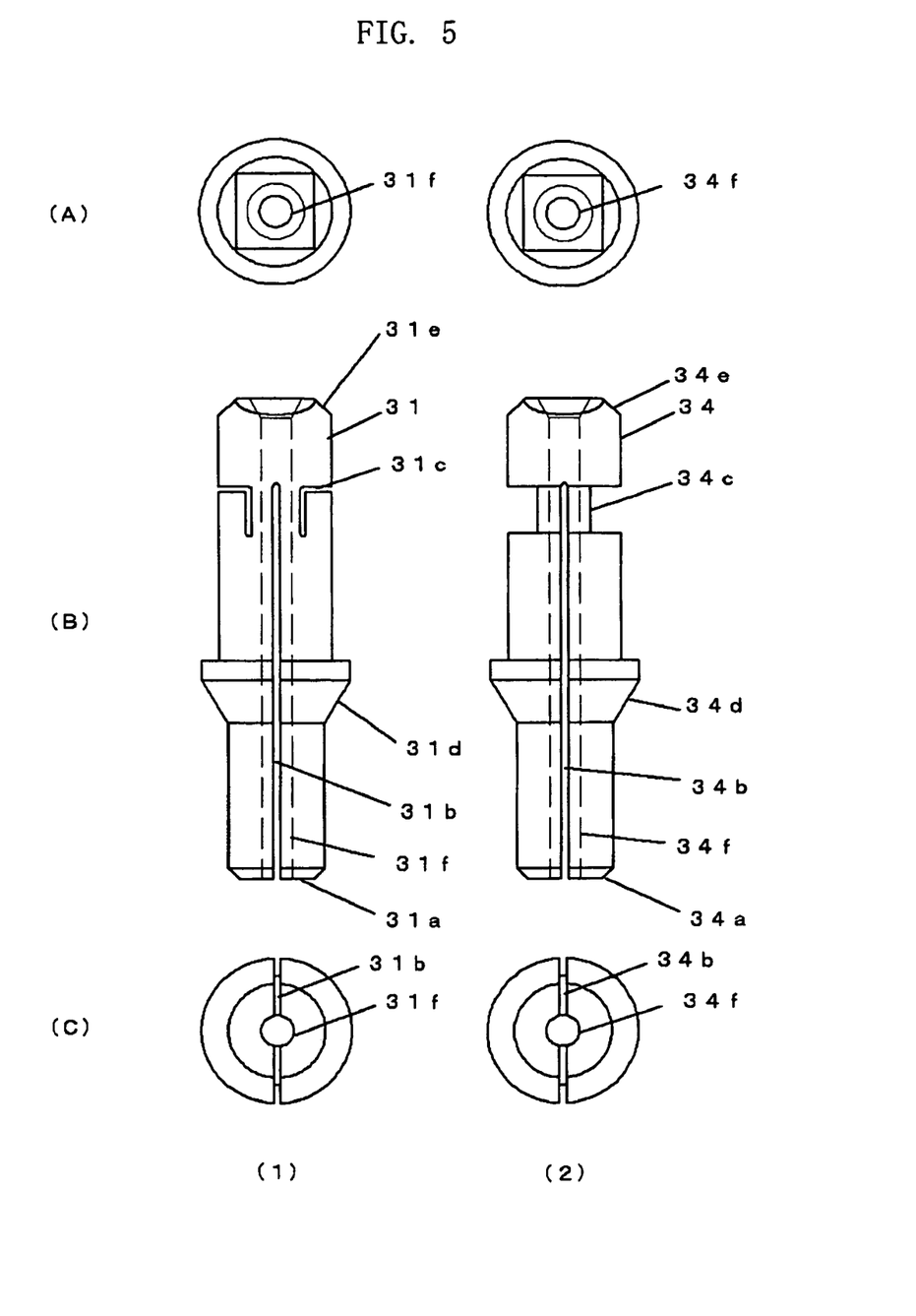
FIG. 5 shows an example of power feed tip for the welding torch of the second embodiment.
Figure 6:
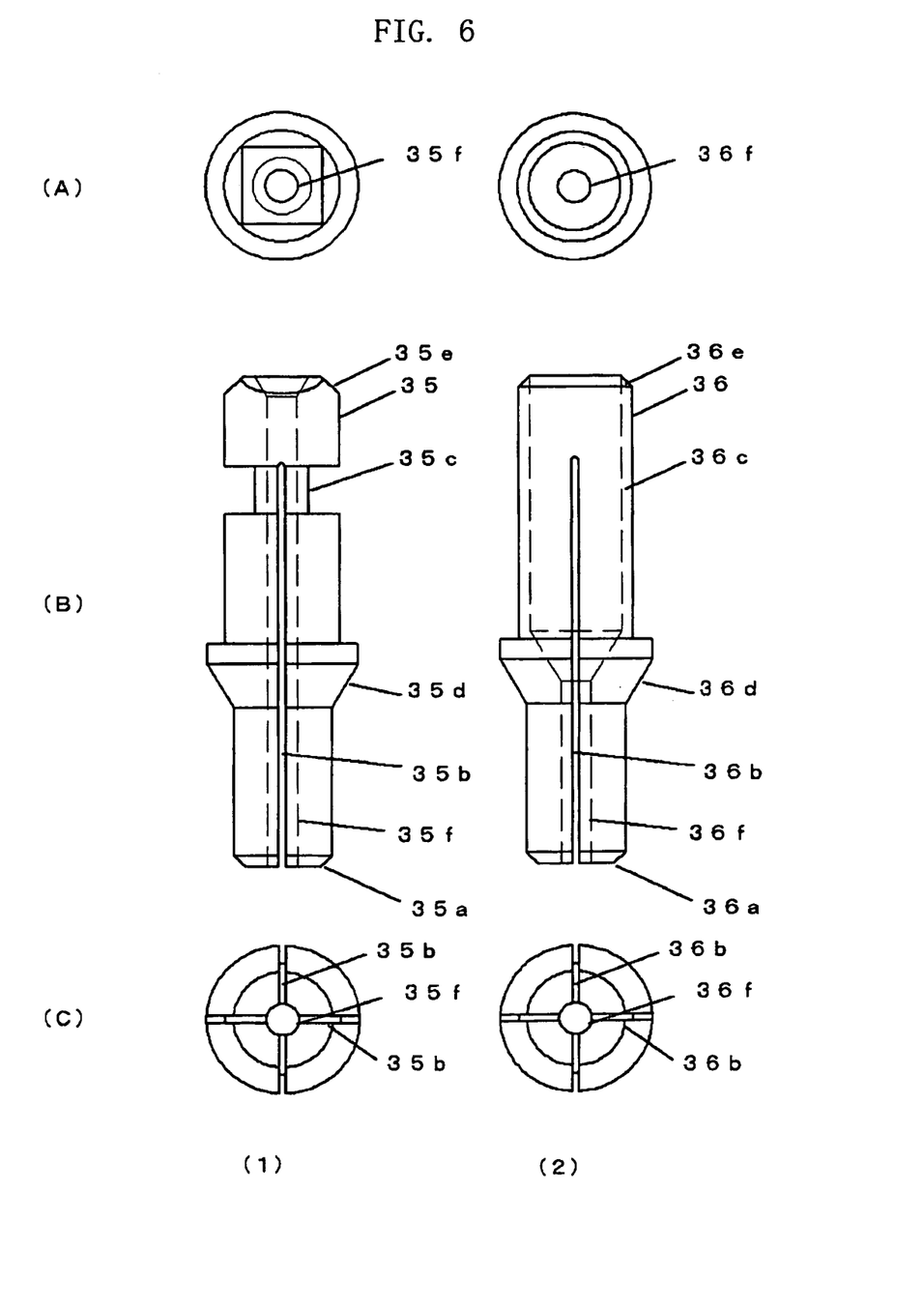
FIG. 6 shows another example of power feed tip for the welding torch of the second embodiment.

FIG. 3 is a sectional view showing a welding torch 30 according to a second embodiment of the present invention. FIG. 4 is an exploded sectional view of the welding torch 30. FIGS. 5 and 6 show power feed tips for the welding torch 30. In FIGS. 5 and 6, (A) is a plan view, (B) is a front view and (C) is a bottom view. Referring to FIGS. 3 and 4, the power feed tip 31 and the tip holder 32, which differ in function from those of the welding torch of the first embodiment shown in FIG. 1, will be mainly described. The parts which have the same function as those of the welding torch of the first embodiment are designated by the same reference signs as those used for the first embodiment, and the description is appropriately omitted.

As shown in FIG. 3, a tip holder 32 is mounted to the front end of a tip body 22 and includes an insertion hole 38. A heat-resistant member 24 is embedded in the front end of the tip holder 32. The heat-resistant member 24 is fixed by a ring 25. This arrangement suppresses the transfer of heat generated at the welding point to the power feed tip 31 and hence reduces the abrasion of the power feed tip 31 so that the lifetime of the power feed tip is increased. Each of the tip holder 32, the heat-resistant member 24 and the ring 25 is formed with a wire insertion hole at the axial center.

The power feed tip 31 is formed with a wire insertion hole 31f at the axial center and provided in the tip body 22. The front end of the power feed tip 31 is inserted in the tip holder 32. The base end of the power feed tip 31 is held in contact with the front end of the pressing shaft 27. Thus, the power feed tip 31 is pressed by the pressing shaft 27 and the tip holder 23.

As shown in FIG. 5(1), the power feed tip 31 is formed with a vertical slit 31b extending from the front end 31a along the wire insertion hole 31f. The power feed tip is further formed with a horizontal slit 31c provided adjacent to the terminating end of the vertical slit 31b and extending perpendicularly to the vertical slit 31b.

The side surface of the power feed tip 31 is formed with a tapered portion 31d for coming into contact with the base end of the tip holder 32. With this arrangement, when the front end of the power feed tip 31 is inserted into the tip holder 32, a space 33 is defined between the inner surface of the tip holder 32 and the front end 31a of the power feed tip (see FIG. 3). Preferably, the space 33 extends also between the inner surface of the tip holder 32 and the side surface of the power feed tip 31. Similarly to the first embodiment, the space 33 serves to prevent the heat generated in welding from being directly transferred to the power feed tip 31.

Preferably, the base end of the tip holder 32 is formed with an inclined surface 32a for surface contact with the tapered portion 31d of the power feed tip 31. With this arrangement, the electric power supplied to the torch body 21 is properly supplied to the power feed tip 31 through the tip body 22 and the tip holder 32.

Preferably, the base end of the power feed tip 31 is formed with a tapered portion 31e, whereas the front end of the pressing shaft 27 is formed with an inclined surface 27a for surface contact with the tapered portion 31e of the power feed tip 31. With this arrangement, the pressing shaft 27 pressed by the spring 26 stably presses the power feed tip 31.

Referring now to FIGS. 5 and 6, power feed tips will be described. As noted before, the power feed tip 31 shown in FIG. 5(1) is formed with the vertical slit 31b and the horizontal slit 31c. Thus, when the front end of the power feed tip 31 is inserted in the tip holder 32 and the power feed tip 31 is pressed by the pressing shaft 27 and the tip holder 32, the inner surface of the wire insertion hole of the power feed tip 31 presses the welding wire 5.

The power feed tip 34 shown in FIG. 5(2) is a variation of the above-described power feed tip 31. Similarly to the power feed tip 31, the power feed tip 34 is formed with a wire-insertion hole 34f provided at the axial center and a vertical slit 34b extending from the front end 34a along the wire insertion hole 34f. Instead of providing the horizontal slit 31c, the wall thickness of the power feed tip 34 is reduced at the portion 34c adjacent to the terminating end of the vertical slit 34b. The tapered portion 34d formed at the side surface and the tapered portion 34e formed at the base end of the power feed tip 34 function in the same manner as the tapered portion 31d and the tapered portion 31e of the power feed tip 31. The structure shown in FIG. 5(2) is provided easily by machining and hence reduces the manufacturing cost.

The power feed tip 35 shown in FIG. 6(1) is a variation of the power feed tip 34 shown in FIG. 5(2). The power feed tip 35 is formed with a wire-insertion hole 35f provided at the axial center and two vertical slits 35b extending from the front end 35a along the wire insertion hole 35f. The wall thickness of the power feed tip 35 is reduced at the portion 35c adjacent to the terminating end of the vertical slit 35b. The tapered portion 35d formed at the side surface and the tapered portion 35e formed at the base end of the power feed tip 35 function in the same manner as the tapered portion 31d and the tapered portion 31e of the power feed tip 31 shown in FIG. 5(1). With this arrangement, the inner surface of the wire insertion hole 35f of the power feed tip uniformly presses the welding wire 5. Thus, stable power supply is achieved.

The power feed tip 36 shown in FIG. 6(2) is a variation of the above-described power feed tip 35. The power feed tip 36 is formed with a wire-insertion hole 36f provided at the axial center and two vertical slits 36b extending from the front end 36a along the wire insertion hole 36f. At the region 36c extending from the position adjacent to the terminating end toward the intermediate portion of the vertical slit 36b (i.e., the portion above the upper end of the tapered portion 36d), the wall thickness of the power feed tip 35 is reduced uniformly from the inner side. Thus, the power feed tip includes a hole having an inner diameter which is larger than that of the wire insertion hole 36f. The tapered portion 36d formed at the side surface and the tapered portion 36e formed at the base end of the power feed tip 36 function in the same manner as the tapered portion 31d and the tapered portion 31e of the power feed tip 31. This structure is provided easily by machining and hence reduces the manufacturing cost.

In the power feed tips 31-36 described above, one or two vertical slits are provided. However, in the present invention, the number of the vertical slits is not limited to these, and three or more vertical slits may be provided.

The operation of the second embodiment will be described below. As noted before, the tip body 22 is mounted to the front end of the torch body 21, and the tip holder 32 is mounted to the front end of the tip body 22. The spring 26 and the pressing shaft 27 are provided in the tip body 22. The base end of the spring 26 is held in contact with the front end of the torch body 21. The base end of the pressing shaft 27 is held in contact with the front end of the spring 26.

The power feed tip 31 is provided in the tip body 22. The front end of the power feed tip 31 is inserted in the tip holder 32. In this state, the tapered portion 31d formed at the side surface of the power feed tip 31 is held in contact with the inclined surface 32a formed at the base end of the tip holder 32. With this arrangement, the space 33 is defined between the inner surface of the tip holder 32 and the front end 31a of the power feed tip. Further, the tapered portion 31e formed at the base end of the power feed tip 31 is held in contact with the inclined surface 27a formed at the front end of the pressing shaft 27.

The orifice 17 is provided at a lower portion of the tip body 22. The nozzle 16 is provided to surround the tip holder 32 and the orifice 17. Shielding gas is belched through the injection hole of the orifice 17. The belched shielding gas shields the arc, the molten pool and the nearby portion from nitrogen and oxygen in the air. The insulating bush 18 is provided around the tip body 22.

With the above-described arrangement, the spring 26 presses the pressing shaft 27, and the pressing shaft 27 and the tip holder 32 press the power feed tip 31. Since the power feed tip 31 is formed with the vertical slit 31b and the horizontal slit 31c, the inner surface of the wire insertion hole of the power feed tip 31 presses the welding wire 5. The electric power supplied to the torch body 21 is supplied to the power feed tip 31 through the tip body 22 and the tip holder 32.

With this arrangement, the space 33 defined between the inner surface of the tip holder 32 and the front end 31a of the power feed tip prevents the heat generated in welding from being directly transferred to the power feed tip 31. Thus, the power feed tip 31 does not directly receive arc heat, and hence, is prevented from being softened. As a result, the abrasion of the power feed tip 31 is suppressed, whereby the lifetime of the power feed tip is increased. Further, since the power feed tip 31 is not heated to a high temperature, an oxide film is not formed on the surface of the power feed tip 31. Thus, proper power supply is maintained.

The welding wire 5 is fed from a wire feeder 6 (see FIG. 10) to the power feed tip 31 while being guided by a wire guide liner (not shown). In this process, the welding wire 5 is rubbed against other parts to some degree. Thus, the surface of the welding wire is hurt, and in some cases, shaved off so that shavings are produced. Such shavings can be carried to the front end of the power feed tip 31 via the wire guide liner. Generally, the space between the wire insertion hole of the power feed tip 31 and the welding wire 5 is extremely small, which may be about 0.1 mm, for example. Thus, when the shavings enter the wire insertion hole of the power feed tip 31, the feed resistance increases. As a result, the welding wire 5 is not properly fed, and hence, proper welding cannot be performed.

However, with the welding torch 30 according to the second embodiment of the present invention, the shavings of the welding wire 5 are pushed out through the vertical slit 31*b* and the horizontal slit 31*c* and do not remain inside. Thus, the clogging of the interior of the power feed tip 31 with shavings of the welding wire 5 and the resulting wire feed failure do not occur.

Moreover, since the welding wire 5 is constantly pressed by the power feed tip 31, stable power supply is maintained. Further, owing to the provision of the vertical slit 31*b* and the horizontal slit 31*c*, the power feed tip 31 moves flexibly in accordance with the movement of the welding wire 5. Thus, stable power supply is performed, and hence, uniform weld beads are formed.

In a conventional power feed tip, the welding wire 5 tends to deviate from the intended welding position due to the existence of a space between the wire insertion hole of the power feed tip and the welding wire 5. Unlike this, in the welding torch 30 according to the second embodiment of the present invention, the power feed tip 31 is inserted in the tip holder 32, and the tip holder 31 constantly presses the welding wire 5. With this arrangement, the welding wire 5 is constantly centered, which is effective for preventing the welding wire 5 from deviating from the intended welding position.

Unlike the conventional structure, the power feed tip 28 having the above-described shape can be formed by simple machining, and screwing of the base end of the power feed tip is not necessary. Thus, the machining time is reduced. Further, hard materials such as copper-tungsten the screwing of which is difficult can be used as the material of the power feed tip 31.

The power feed tip 31 can be reused by changing its contact point with the welding wire 5 by rotating the power feed tip within the tip holder 32 and the front end of the tip body 22 to change the mounting position. Further, by plating the tip holder 32, the adhesion of spatters is prevented.

In the first and the second embodiments, instead of embedding the heat-resistant member 24 in the front end of the tip holder, the entirety of the tip holder may be made of a heat-resistant material such as a ceramic material or stainless steel.

Figure 7:
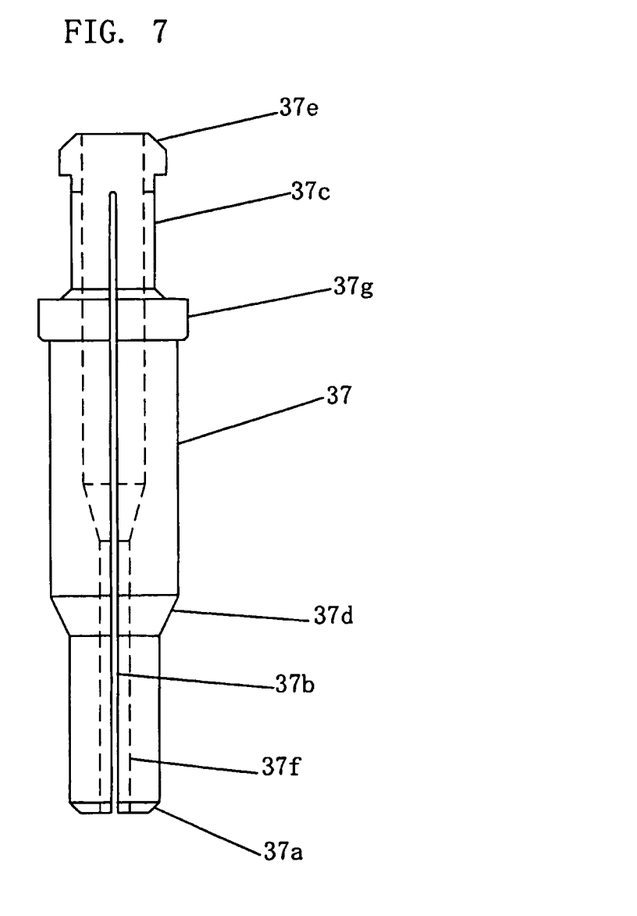
FIG. 7 shows a power feed tip provided with a means for preventing the dropping from the tip body.

The power feed tip 31-36 according to the present invention may be provided with an engagement means for preventing the dropping from the tip body 22. An example of the engagement means is shown in FIG. 7. The illustrated power feed tip 37 is formed with a wire insertion hole 37*f* provided at the axial center and two vertical slits 37*b* extending from the front end 37*a* along the wire insertion hole 37*f*. (Only one vertical slit is shown in the figure.) The wall thickness of the power feed tip 37 is reduced at the portion 37*c* adjacent to the terminating end of the vertical slit 37*b*. The tapered portion 37*d* formed at the side surface and the tapered portion 37*e* formed at the base end of the power feed tip 37 function in the same manner as the tapered portion 31*d* and the tapered portion 31*e* of the power feed tip 31 shown in FIG. 5(1). The power feed tip 37 is formed with an engagement portion 37*g* for preventing the dropping from the tip body. As will be understood from FIG. 7, the engagement portion 37*g* is larger in outer diameter than other portions of the power feed tip 37. In the power feed tip 37, the portion between the engagement portion 37*g* and the tapered portion 37*d* comprises a cylindrical portion having a constant outer diameter (hereinafter refereed to as "central cylindrical portion"). Similarly, the portion between the tapered portion 37*d* and the tapered portion 37*a* comprises a cylindrical portion having a constant outer diameter (hereinafter refereed to as "front cylindrical portion"). When the outer diameters of the engagement portion 37*g*, the central cylindrical portion and the front cylindrical portion are expressed by $d_1$, $d_2$ and $d_3$, respectively, $d_1$ is the largest, whereas $d_3$ is the smallest (i.e., $d_1 > d_2 > d_3$).

Figure 8:
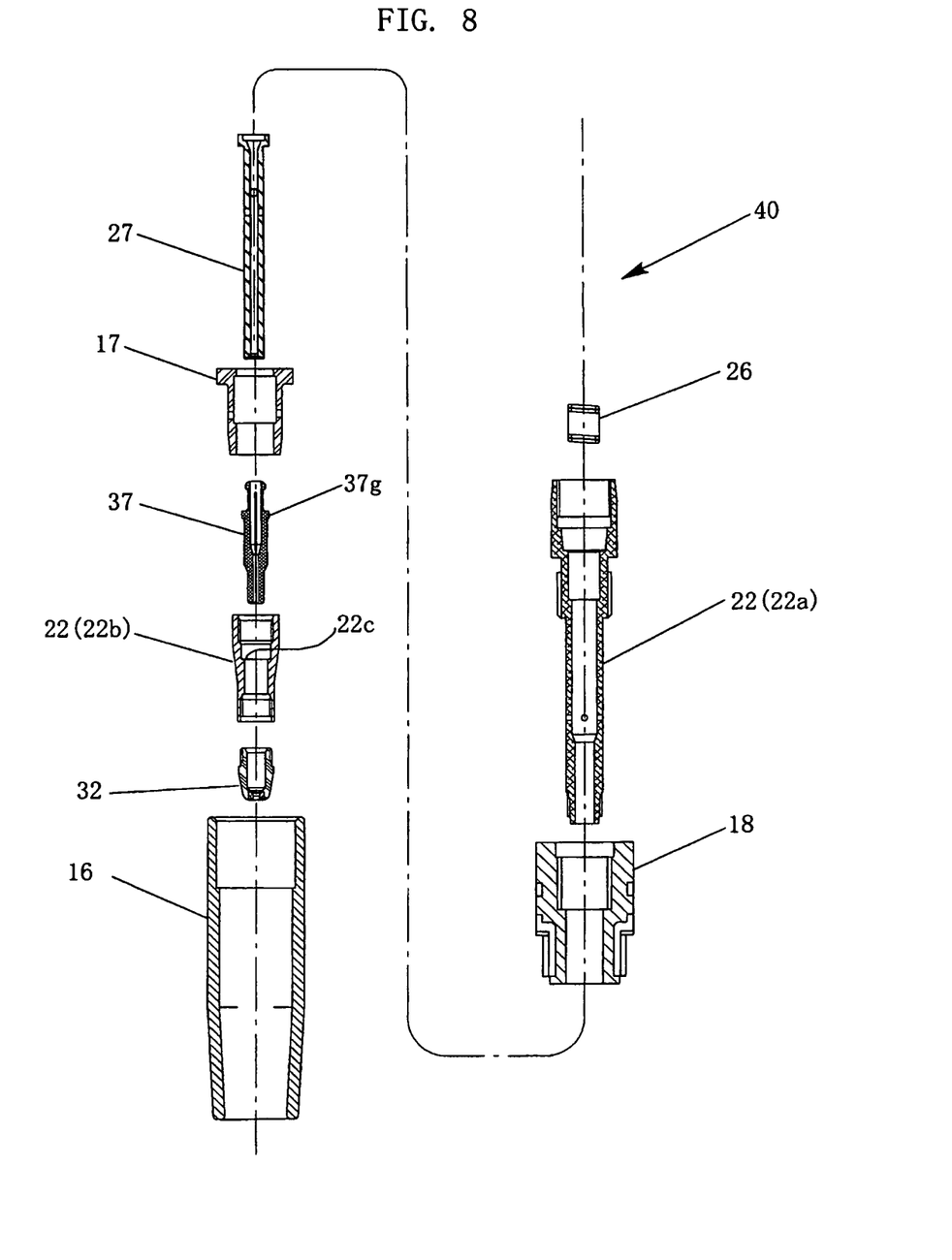
FIG. 8 is an exploded view showing a welding torch using the power feed tip of FIG. 7.

FIG. 8 is an exploded sectional view showing the structure of a welding torch 40 using the power feed tip 37 and corresponds to FIG. 4. In FIG. 8, the illustration of the torch body 21 is omitted (see FIG. 9). Similarly to the welding torch 30 shown in FIG. 4, the welding torch 40 shown in FIG. 8 includes a spring 20, a tip body 22, an insulating bush 18, a pressing shaft 27, an orifice 17, a power feed tip 37, a tip holder 32 and a nozzle 16. Although the structure and function of these elements are substantially the same as those of the corresponding elements shown in FIG. 4, the following two points are mainly different. Firstly, as noted above, the power feed tip 37 is provided with the engagement portion 37*g* for preventing the dropping from the tip body 22. Secondly, the tip body 22 of the welding torch 40 comprises two elements, i.e., a relatively long first member 22*a* and a second member 22*b* which is shorter than the first member 22*a*. The base end of the second member 22*b* is formed with a receiving hole (first receiving hole) of a size capable of receiving the front end of the first member 22*a*. For instance, the first receiving hole has a threaded inner wall, and the first member 22*a* and the second member 22*b* are removably connected together by screwing the front end of the first member 22*a* to the base end (first receiving hole) of the second member 22*b* (see FIG. 9).

Figure 9:
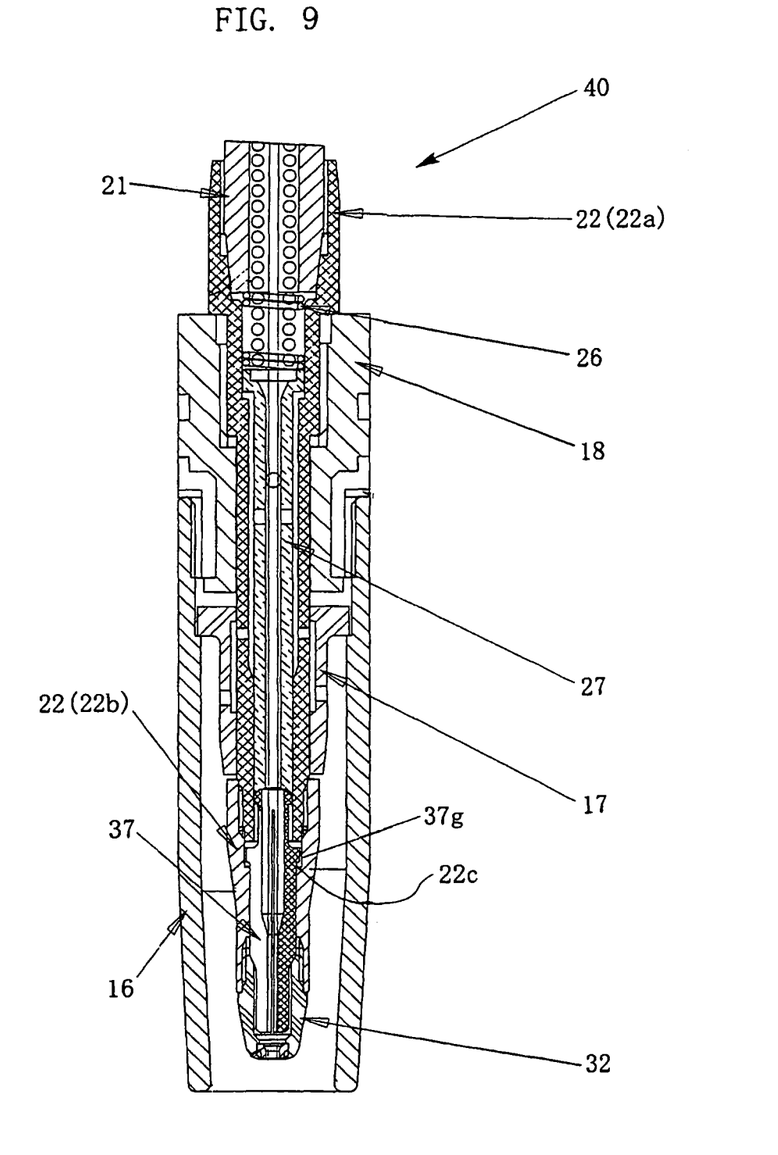
FIG. 9 is a sectional view showing the assembled state of the welding torch of FIG. 8.

FIG. 9 is a sectional view showing the welding torch 40 in the assembled state. As will be understood from this figure and FIG. 8, in the assembled state, the power feed tip 37 is fitted in a second receiving hole formed in the second member 22*b* of the tip body 22. Specifically, the central cylindrical portion of the power feed tip 37 is fitted in the second receiving hole. The inner diameter of the second receiving hole is smaller than that of the first receiving hole (i.e., the portion for fixing the front end of the first member 22*a*). The inner diameter of the second receiving hole is smaller than the outer diameter of the engagement portion 37*g* of the power feed tip 37.

With this arrangement, the engagement portion 37*g* of the power feed tip 37 engages the stepped portion 22*c* formed in the second member 22*b* and cannot pass through the second receiving hole. Thus, even when the tip holder 32 is removed from the front end of the second member 22*b*, the power feed tip 37 does not drop from the second member 22*b* of the tip body 22. Generally, due to the adhesion of spatters or influence of heat, the replacement of a tip holder needs to be performed more frequently than the replacement of a power feed tip. Thus, by employing the structure in which the power feed tip does not drop from the tip body, the work to replace the tip holder is performed efficiently.

The foregoing embodiments have been described as to the welding using a robot. However, the welding torch according to the present invention is not limited to automatic welding by a robot and is also applicable to semiautomatic welding torch for manual welding.

The invention claimed is:

1. A consumable electrode gas shield arc welding torch comprising:
   a torch body provided with a wire insertion hole at an axial center;

a tip body provided with a wire insertion hole at an axial center and mounted to a front end of the torch body;

a tip holder provided with an insertion hole at an axial center and mounted to a front end of the tip body;

a spring provided with a wire insertion hole at an axial center and provided in the tip body to come into contact with the front end of the torch body;

a pressing shaft provided with a wire insertion hole at an axial center and provided in the tip body to come into contact with a front end of the spring; and a power supply tip provided with a wire insertion hole at an axial center and pressed by the pressing shaft and the tip holder;

wherein the power supply tip is provided with a front end and a base end opposite to the front end of the power supply tip, and formed with at least one vertical slit extending from the front end of the power supply tip along the wire insertion hole of the tip;

wherein the power supply tip includes a side surface formed with a tapered surface which is slidable in contact with a base end of the tip holder so that a space is defined between an inner surface of the tip holder and the front end of the power supply tip when the front end of the power supply tip is inserted into the insertion hole of the tip holder;

wherein the tapered surface is spaced apart from the front end of the power supply tip and the vertical slit extends from the front end of the power supply tip toward the base end of the power supply tip beyond the tapered surface, the vertical slit being configured to divide the tapered surface into parts;

wherein the spring presses the pressing shaft and the pressing shaft presses the power supply tip to cause the tapered surface of the power supply tip to slide along the base end of the tip holder in a direction toward the front end so that an inner surface of the wire insertion hole of the power supply tip presses a welding wire;

wherein the tapered surface of the power supply tip is configured to increase monotonically in diameter from the front end of the power supply tip toward the base end of the power supply tip; and wherein the tapered surface of the power supply tip has a maximum diameter, the insertion hole of the tip holder has a maximum diameter, and the maximum diameter of the tapered surface of the power supply tip is greater than the maximum diameter of the insertion hole of the tip holder.

2. The consumable electrode gas shield arc welding torch according to claim 1, wherein the power supply tip is further formed with a horizontal slit provided adjacent to a terminating end of the vertical slit and extending perpendicularly to the vertical slit.

3. The consumable electrode gas shield arc welding torch according to claim 1, wherein the power supply tip includes a thin-walled portion adjacent to a terminating end of the vertical slit.

4. The consumable electrode gas shield arc welding torch according to claim 1, wherein the tip holder is heat-resistant.

5. The consumable electrode gas shield arc welding torch according to claim 1, further comprising a heat-resistant member provided with a wire insertion hole at an axial center and embedded in a front end of the tip holder.

6. The consumable electrode gas shield arc welding torch according to claim 1, wherein the base end of the tip holder is formed with an inclined surface for coming into contact with the tapered surface of the power supply tip.

7. The consumable electrode gas shield arc welding torch according to claim 1, wherein the base end of the power supply tip is formed with an additional tapered surface, and wherein the pressing shaft includes a front end formed with an inclined surface for coming into contact with the tapered surface of the base end of the power supply tip.

8. A power supply tip to be used for a consumable electrode gas shield arc welding torch comprising a torch body, a tip body mounted to a front end of the torch body, a tip holder mounted to a front end of the tip body, a spring provided in the tip body to come into contact with the front end of the torch body, a pressing shaft provided in the tip body to come into contact with a front end of the spring, the power supply tip being pressed by the pressing shaft and the tip holder, the power supply tip comprising:

a front end for insertion into an insertion hole of the tip holder;

a base end opposite to the front end of the power supply tip;

a wire insertion hole extending along an axial center of the power supply tip;

at least one vertical slit extending from the front end of the power supply tip along the wire insertion hole; and a tapered surface which is slidable in contact with a base end of the tip holder so that a space is defined between an inner surface of the tip holder and the front end of the power supply tip when the front end of the power supply tip is inserted into the insertion hole of the tip holder;

wherein the tapered surface is spaced apart from the front end of the power supply tip, and the vertical slit extends from the front end of the power supply tip toward the base end of the power supply tip beyond the tapered surface, the vertical slit being configured to divide the tapered surface into parts;

wherein the tapered surface of the power supply tip is configured to increase monotonically in diameter from the front end of the power supply tip toward the base end of the power supply tip; and wherein the tapered surface of the power supply tip has a maximum diameter, the insertion hole of the tip holder has a maximum diameter, and the maximum diameter of the tapered surface of the power supply tip is greater than the maximum diameter of the insertion hole of the tip holder.

9. The power supply tip according to claim 8, further comprising at least one horizontal slit provided adjacent to a terminating end of the vertical slit and extending perpendicularly to the vertical slit.

10. The power supply tip according to claim 8, further comprising a thin-walled portion adjacent to a terminating end of the vertical slit.

11. The power feed tip according to claim 8, further comprising a drop preventing portion for engagement with part of the tip body.

* * * * *